United States Patent [19]

Hasegawa et al.

[11] Patent Number: 4,613,803
[45] Date of Patent: Sep. 23, 1986

[54] INDUSTRIAL ROBOT AND A METHOD FOR POSITIONING SAME

[75] Inventors: Kiyoshi Hasegawa; Hisashi Matsuo; Hideki Hashimoto, all of Kobe, Japan

[73] Assignee: Kabushiki Kaisha Kobe Seiko Sho, Kobe, Japan

[21] Appl. No.: 701,621

[22] Filed: Feb. 14, 1985

[51] Int. Cl.$^4$ .............................................. G05B 19/42
[52] U.S. Cl. ..................................... 318/568; 318/587; 364/513
[58] Field of Search .................. 318/568, 587; 364/513

[56] References Cited

U.S. PATENT DOCUMENTS

| | | | |
|---|---|---|---|
| 4,119,900 | 10/1978 | Kremnitz | 318/587 |
| 4,125,943 | 11/1978 | Ando | 318/568 |
| 4,344,498 | 8/1982 | Lindfors | 318/587 |
| 4,465,155 | 8/1984 | Collins | 318/587 X |
| 4,500,970 | 2/1985 | Daemmer | 318/587 X |
| 4,536,690 | 8/1985 | Belsterling et al. | 318/568 X |

Primary Examiner—B. Dobeck
Attorney, Agent, or Firm—Oblon, Fisher, Spivak, McClelland & Maier

[57] ABSTRACT

A self-traveling robot system capable of being automatically positioned with respect to a workpiece including a robot for work on a continuous object, a truck for moving the robot along the continuous object, a distance detection mechanism mounted to the robot for detecting a distance between the robot and the continuous object, a deviation detecting circuit for comparing the distance as detected by the distance detection mechanism with a predetermined value and detecting a deviation between the distance and the predetermined value, and a travel path correcting mechanism for correcting an advance direction of the truck according to the deviation. A method of positioning the self-traveling robot system with respect to the workpiece is also disclosed, which includes the steps of (a) driving a robot which has stopped at a working position and detecting distances between a swiveling table and two measuring points on the workpiece; (b) calculating a tilt angle ($\theta$) of the swiveling table relative to the workpiece and a deflection amount (l) from the swiveling table to a reference travel path on which the robot is to be normally traveled according to data obtained regarding the distance; (c) extending outriggers to separate the truck from a floor, and then rotating the truck at a right angle to the workpiece; (d) contracting the outriggers after step (c) to bring the truck into contact with the floor, and then rotating the swiveling table to a position parallel to the workpiece; (e) moving the truck by the deflection amount (l) to register a center of the truck with the reference travel path; and (f) extending the outriggers to separate the truck from the floor, then rotating the truck to a position parallel to the workpiece, and further contracting the outriggers.

3 Claims, 7 Drawing Figures

INDUSTRIAL ROBOT AND A METHOD FOR POSITIONING SAME

BACKGROUND OF THE INVENTION (1) Field of the Invention

This invention relates to an industrial robot, and a method of positioning the same as to be capable of traveling with a truck, and more particularly to an industrial robot and a method of positioning the same so as to be automatically positioned with respect to a workpiece.

(2) Description of the Prior Art

In the case that an industrial robot of such type capable of self-traveling by use of traveling truck, such as a spray robot for spraying a refractory material (e.g., rock wool) and cement, etc. and a coating robot is positioned with respect to a workpiece such as a wall surface and a beam, a known method is generally employed for positioning the robot by wireless induction means using as a guide an induction wire laid on the ground and a floor.

However, such a conventional positioning method using the wireless induction means is not satisfactory in terms of accuracy of positioning, and cannot accurately correct the position of the robot in response to a charge in position of the workpiece. Further, the conventional method lacks means for correcting accumulated errors, and requires laying the induction wire on the floor, resulting in an increase in cost.

Especially, in recent buildings, there are many occasions that a refractory material such as rock wool is sprayed onto an iron beam or the like so as to improve fire resistance. Accordingly, a spray robot for carrying out such a spraying work, as noted above is required to perform highly accurate spraying work and therefore the conventional positioning method of the wireless induction type is not satisfactory.

SUMMARY OF THE INVENTION

Accordingly, it is a primary object of the present invention to improve accuracy of positioning an industrial robot capable of self-traveling with a traveling truck.

It is another object of the present invention to provide an industrial robot system which may automatically measure a present position of a robot to compute a deviation between the present position and a target position, and may exhibit an automatic position correcting function where the position of the robot is automatically corrected according to a computed result.

It is a further object of the present invention to provide a method of automatically positioning a self-traveling robot system with respect to a workpiece.

According to one aspect of the present invention, there is provided a self-traveling robot system comprising a robot for working on to a continuous object, a truck for moving the robot along the continuous object, a distance detection means mounted to the robot for detecting a distance between the robot and the continuous object, a deviation detecting circuit for comparing the distance as detected by the distance detection means with a predetermined value and detecting a deviation between the distance and the predetermined value, and travel path correcting means for correcting an advance direction of the truck according to the deviation.

According to another aspect of the present invention, there is further provided a method of operation of the self-traveling robot system with respect to the workpiece which includes the steps of (a) driving a robot which has stopped at a working position and detecting distances between a swiveling table and two measuring points on the workpiece; (b) calculating a tilt angle ($\theta$) of the swiveling table relative to the workpiece and a deflection amount (l) from the swiveling table to a reference travel path along which the robot normally travels according to the data relating to the distances; (c) extending outriggers to separate the truck from a floor, and then rotating the truck at a right angle to the workpiece; (d) contracting the outriggers after step (c) so as to bring the truck into contact with the floor, and then rotating the swiveling table to a position parallel to the workpiece; (e) moving the truck by the deflection amount (l) to register the center of the truck with the reference travel path; and (f) extending the outriggers to separate the truck from the floor, then rotating the truck to a position parallel to the workpiece and further contracting the outriggers.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DETAILED DESCRIPTION OF THE PREFERRED EMBODIMENTS

Figure 1:
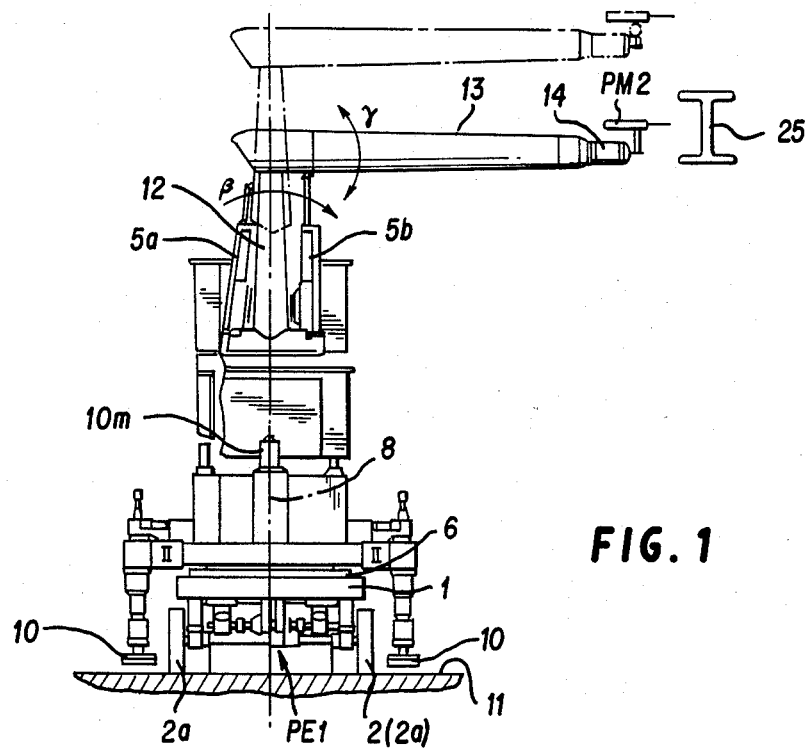
FIG. 1 is an elevational view of a rock wool spraying robot according to the present invention.
Figure 2:
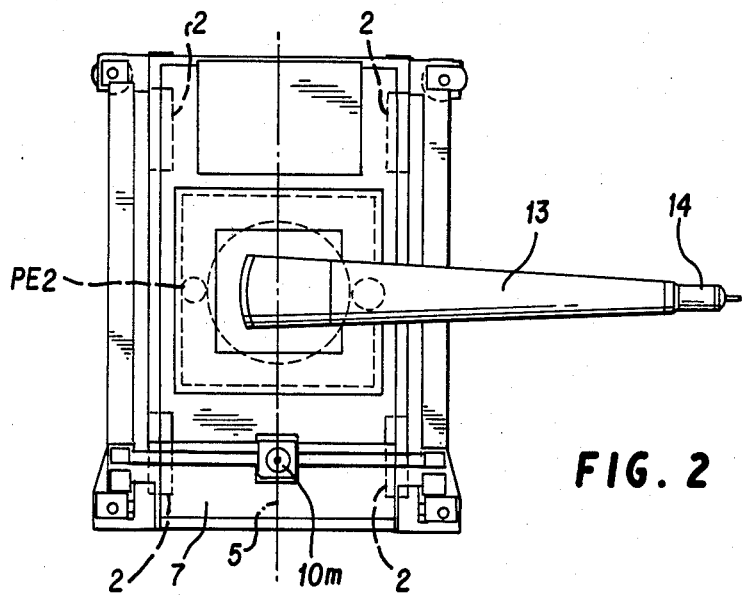
FIG. 2 is a top plan view of FIG. 1.
Figure 3:
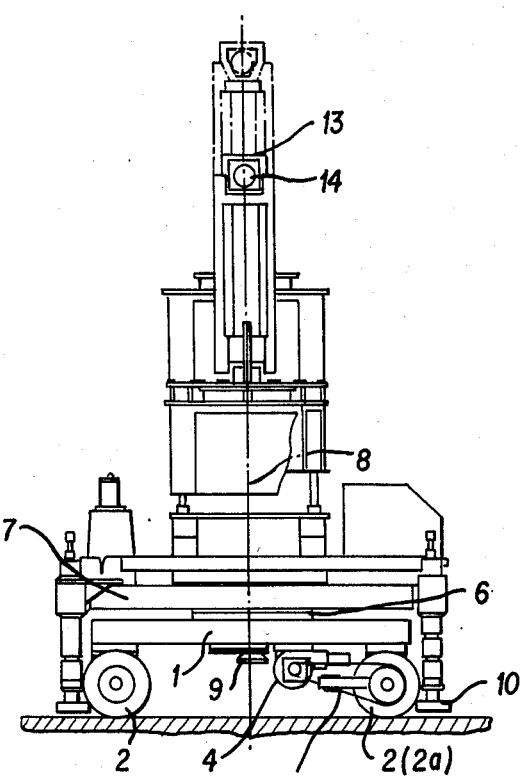
FIG. 3 is a side elevational view of FIG. 1.

Referring now to FIGS. 1 to 3, a truck 1 is provided with four rotatable wheels 2 at a lower portion thereof, wherein or two drive wheels 2a of the four wheels 2 are connected through a chain 3 to a traveling motor 4 so that the truck 1 may be travel due to the rotation of the traveling motor 4 in a direction of an axis 5 of the truck 1 as shown in FIG. 2.

The truck 1 is connected via a swiveling bearing 6 mounted thereon to a substantially planar swiveling table 7, which table is permitted to swivel about a vertical axis 8 of the truck 1 as a center of the swiveling bearing 6. The swiveling table 7 is driven by a swiveling motor 9 fixed on the swiveling table 7 to swivel in a horizontal plane with respect to the truck 1.

Pulse encoders $PE_1$ and $PE_2$ are connected to the traveling motor 4 and the swiveling motor 9, respectively so as to detect a rotational angle of each motor.

The swiveling table 7 is provided at four corners thereof with vertically extensible outriggers 10 which are driven by an outrigger driving motor $10_m$ mounted on the swiveling table 7 to be extended and contracted. The amount of extension and contraction of the outriggers 10 is detected by a potentiometer $PM_1$.

A contracted condition of the outriggers 10 is shown by a solid line in FIGS. 1 to 3. When the outriggers 10 are extended from this contracted condition, the swiveling table 7 and the truck 1 as mounted via the swiveling bearing 6 to the table 7 are raised to hold the wheels 2 away from a floor 11.

There are provided over the swiveling table 7 a vertical arm 12 driven to swing in a vertical plane including the vertical axis 8, and a horizontal arm 13 mounted to a free end of the vertical arm 12 and driven to swing in the swinging plane in a manner similar to that of the vertical arm 12. There is further provided a position detecting potentiometer $PM_2$ mounted through a wrist portion 14 having a plurality of degrees of freedom to a free end of the horizontal arm 13. A swing angle of the vertical arm 12 and the horizontal arm 13 is detected by pulse encoders $PE_a$ and $PE_b$ which are mounted to arm drive motors $M_a$ and $M_b$ for driving each arm, respectively.

Figure 4:
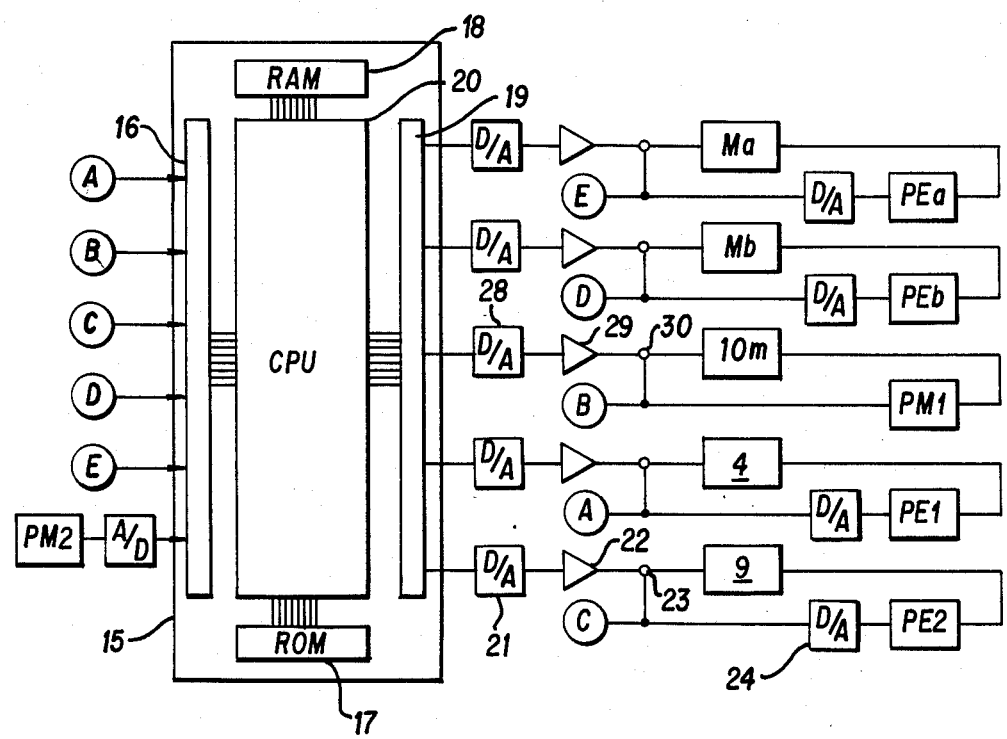
FIG. 4 is a control circuit diagram for the spray robot according to the present invention.

FIG. 4 shows an example of a control circuit for a spray robot as constituted in the above manner, in which output lines A and C of the pulse encoders $PE_1$ and $PE_2$, output lines E and D of the pulse encoders $PE_a$ and $PE_b$, an output line B of the potentiometer $PM_1$, and the potentiometer $PM_2$ are connected to an input interface circuit 16 constituting a microcomputer 15.

The microcomputer 15 may be selected from known examples, and such comprises an input interface circuit 16 for receiving signals from various sensors, and a central processing unit (CPU) 20 for operating signals which have been output from the input interface circuit 16 according to a program stored in a read only memory (ROM) 17 and feeding an output signal to an output interface circuit 19 connected to various driving devices and indicating devices, etc., while simultaneously storing or accesssing various data to a random access memory (RAM) 18 as required. The swiveling motor 9, traveling motor 4, outrigger driving motor 10m and arm driving motors Ma and Mb are connected through respective automatic control systems to the output interface circuit 19.

The automatic control systems for each motor and the outriggers are of substantially the same structure, and therefore a typical automatic control system for the swiveling motor 9 will be described below with the other structure omitted. A target position signal of the swiveling table 7 to be fed from the output interface circuit 19 is converted to an analog signal by a D/A converter 21, and is then transmitted through an amplifier 22 to a comparator 23 and sequentially to the traveling motor 9. At the same time, the rotational angle of the traveling motor 9 is detected by the pulse encoder $PE_1$, and an amount of such detected angle is transmitted through the D/A converter 24 to the comparator 23. Thus, the swiveling motor 9 is driven to rotate in such a direction that the difference between the amount by the pulse encoder $PE_1$ and the target position signal becomes zero, thereby determining the rotational position of the truck 1 relative to the swiveling table 7.

Under a teaching condition, the reading amount of detection of the pulse encoder $PE_1$ as exhibited from the D/A converter 24 is transmitted through the input interface circuit 16 to the CPU 20, and is stored in the RAM 18 as teaching position data.

Next, a working procedure for positioning the spray robot will be described with reference to the accompanying drawings of FIGS. 5 to 7.

The following description is directed to a procedure for positioning the spray robot along an iron beam 25. Symbols (a), (b), (c) . . . in FIG. 5 indicate step numbers corresponding to each function of the robot. First, in step (a), the wheels 2 are driven by the traveling motor 4 to move the truck 1.

Under this condition, a distance of travel of the truck 1 is detected by the pulse encoder $PE_1$, and then whether or not an output value from the pulse encoder $PE_1$ has reached a value corresponding to a predetermined working position is judged in step (b). When it is judged that the output value has not reached the working position, operation is returned to step (a) to continue movement of the truck 1. On the other hand, when it is judged that the output value has reached the working position, the traveling motor 4 is deactivated in step (c) to stop the truck 1.

Figure 6:
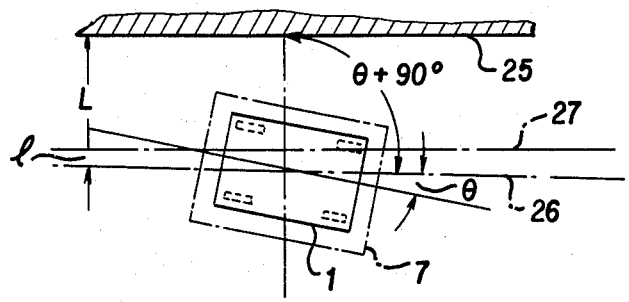
FIG. 6 is a plan view of a truck and a swiveling table, showing movement thereof.
Figure 7:
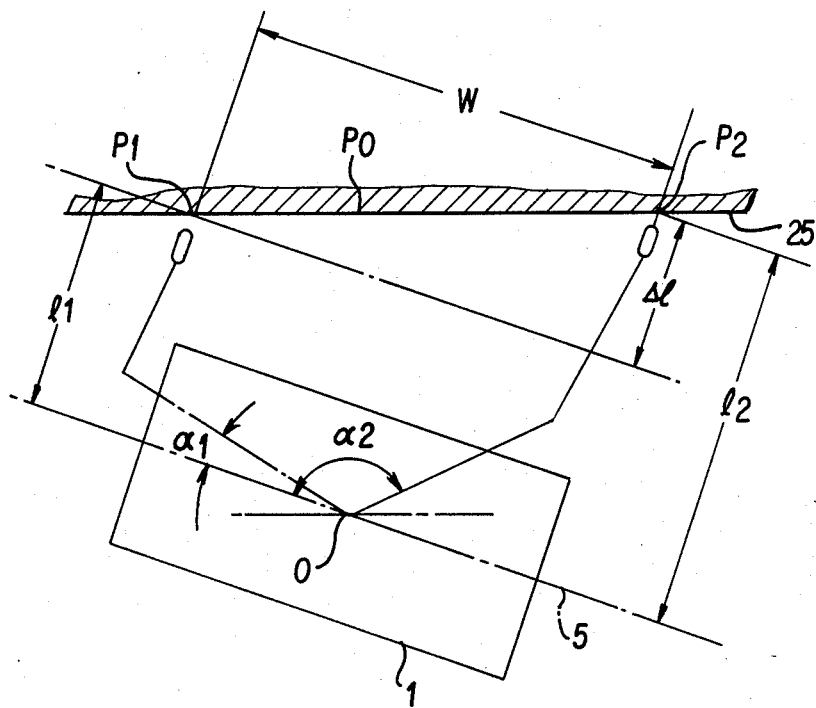
FIG. 7 is a plan view showing tilt and displacement of the robot with respect to the workpiece.

Referring to FIG. 6, the truck 1 under the above condition is shown by a solid line, while the swiveling table 7 placed on the truck 1 is shown by a double chain line. The center of the swiveling bearing 6, that is, a position of the vertical axis 8 is represented by a symbol (O). In FIG. 6, the axis 5 in the direction of the wheels 2 of the truck 1 is parallel to the iron beam 25, and simultaneously is tilted by an angle ($\theta$) relative to a segment 26 lying on the center (O). The segment 26 lying on the center (O) of the truck 1 is offset by a distance (l) from a reference travel path 27 indicating a travel path where the truck 1 should be moved in parallel relation with the iron beam 25. The direction of the tilt angle ($\theta$) is in a clockwise direction.

The subsequent procedure which will be hereinafter described is intended to improve the accuracy of measurement and the spray position in the following teaching operation and replay operation in such a way that first the truck 1 and the swiveling table 7 are swiveled counterclockwise about the center (O) to arrange the axis 5 of the truck 1 in parallel relation with the iron beam 25, while the center (O) is moved by the distance (l) toward the iron beam 25 to arrange the truck 1 and the swiveling table 7 to a position parallel to the iron beam 25 and away therefrom by a fixed distance (L) as designed.

When the truck 1 is stopped in step (c) as above described, the CPU feeds a signal of a positive direction, that is, a signal for extension of the outriggers 10 through the input interface circuit 19, D/A converter 28, amplifier 29 and comparator 30 to the outrigger driving motor 10m. The amount of extension of the outriggers 10 is measured by the potentiometer $PM_1$ as is above described, and when the detection value becomes a predetermined value, further extension of the outriggers 10 is stopped. At this time, since the outriggers 10 are extended by a distance longer than an initial distance (d) from the floor 11, all the wheels 2 of the truck 1 are raised from the floor 11 and are held away therefrom (step (d)). In such a position where the swiveling table 7 is held over the floor 11 by means of the four outriggers 10, the swiveling motor 9 for swiveling the swiveling table 7 and the motors Ma and Mb for driving the vertical arm 12 and the horizontal arm 13 are driven to move the wrist portion 14 mounted to the free end of the horizontal arm 13 toward the iron beam 25, and to urge a tip end of the potentiometer $PM_2$ which is a kind of position sensor mounted to the wrist portion 14. In such a circumstance as described above the distance between the axis 5 of the truck 1 and a position $P_1$ of the iron beam 25 and the distance between the axis 5 and a position $P_2$ of the iron beam 25 are measured, which positions $P_1$ and $P_2$ are oppositely separated from the center (O) by a distance (W/2) along the axis 5. In other words, the distance between the positions $P_1$ and $P_2$ along the axis 5 is defined as (W) (constant), and the distances between the positions $P_1$ and $P_2$ and the axis 5 are defined as ($l_1$) and ($l_2$), respectively. (See FIG. 7)

The measurement of the distance ($l_1$) and ($l_2$) as above mentioned may be carried out by a known coordinate converting operation with the aid of each length of the horizontal arm 13 and the vertical arm 12, swivel angles ($\alpha_1$) and ($\alpha_2$) of the swiveling table 7 with respect to the positions $P_1$ and $P_2$ (which angles are detected by the pulse encoder $PE_2$.), a swing angle ($\beta$) of the vertical arm 12 and a swing angle ($\gamma$) of the horizontal arm 13 (which angles are detected by the pulse encoders $PE_a$ and $PE_b$ mounted at each articulate portion of the arms 12 and 13 as shown in FIG. 1.). The procedure of the coordinate converting operation is carried out in a known manner, and therefore explanation thereof will be herein omitted.

In this way, the swiveling table 7 and the arms 12 and 13 are swung in step (e), and then the distances ($l_1$) and ($l_2$) are calculated in step (f). In the next step (g), a tilt angle ($\theta$) of the truck 1 relative to the iron beam 25 and a distance (l) or displacement of the actual center (O) from a reference travel path 27 is calculated by using the following operational equations.

$$\theta = \tan^{-1}(\Delta l/W)$$

$$l = (l_1 + l_2)/2 - L$$

In the above equations, $\Delta l$ represents the difference between the distances $l_1$ and $l_2$, and the difference $\Delta l$ is calculated in consideration of positive and negative signs. Generally, any error in the above equations is an increased with increase in the value of ($\theta$). However, since the value of ($\theta$) is not so large, there occurs no problem when adopting the above equations.

Though it is possible to consider influence of the tilt angle ($\theta$), such consideration will be herein omitted.

In this manner, upon completion of calculation of the tilt angle ($\theta$) of the truck 1 and the displacement ($\theta$) from the reference travel path 27 in the step (g), subsequently the direction of the potentiometer $PM_2$ is changed to a vertical direction by bending motion of the wrist portion 14, swinging motion of each arm and swiveling motion of the swiveling table 7, and simultaneously the height of the iron beam 25 at an intermediate point $P_0$ between the positions $P_1$ and $P_2$ is measured to obtain a deviation $\Delta h$ between the height and a reference height. Thus, the amount of deflection of the iron beam 25 is detected. (step (h)).

Subsequently, the CPU 20 feeds a drive signal to the swiveling motor 9 to counterclockwise rotate the truck 1 by an angle of ($\theta + 90°$) relative to the swiveling table 7. By this rotation, the axis 5 of the truck 1 is directed perpendicular to the iron beam 25 (step (i)).

After completion of the determination of the direction of the truck 1, a drive signal for contracting the outriggers 10 is fed to the outrigger driving motor 10m in step (j) to bring the wheels 2 of the truck 1 into contact with the floor. As a result, the outriggers 10 are held away from the floor 11, and accordingly a drive signal is again fed to the swiveling motor 9 in the following step (k) to counterclockwise rotate the swiveling table 7 by the angle ($\theta$) relative to the truck 1.

According to the above-mentioned procedure, the swiveling table 7 is arranged in parallel relation with the iron beam 25. Then, the CPU 20 feeds a drive signal to the traveling motor 4 to move the truck 1 together with the swiveling table 7 over the truck 1 and the arms 12 and 13 by the distance (l). At this time, since all the wheels 2 are directed along the axis 5, that is, perpendicular to the iron beam 25, the truck 1 is moved toward or away from the iron beam 25 by the distance (l) and the center (O) of the truck 1 is moved to lie on the reference travel path 27. (step (m))

Next, the CPU 20 feeds a drive signal for extending the outrigger driving motor 10m to extend the outriggers 10 and to separate the wheels 2 of the truck 1 from the floor 11 (step(n)). Thereafter, a drive signal is fed to the swiveling motor 9 to again separate the truck 1 from the floor 11 and to clockwise swivel the same by 90°. (step (o)) Then, the outriggers 10 are contracted (step (p)) to bring the wheels 2 into contact with the floor 11 and to hold the outriggers 10 away from the floor 11.

In this manner, the truck 1 and the swiveling table 7 are arranged in parallel relation with the iron beam 25, and the center (O) comes to lie on the reference travel path 27, thereby completing the entire positioning operation of the swiveling table 7 with respect to the iron beam 25. Accordingly, as shown in the following step (q), it is possible to perform teach the robot the accurate position of the iron beam 25 and replay this operation using a spray gun substituted for the potentiometer $PM_2$ mounted at the tip end of the wrist portion 14.

Figure 5:
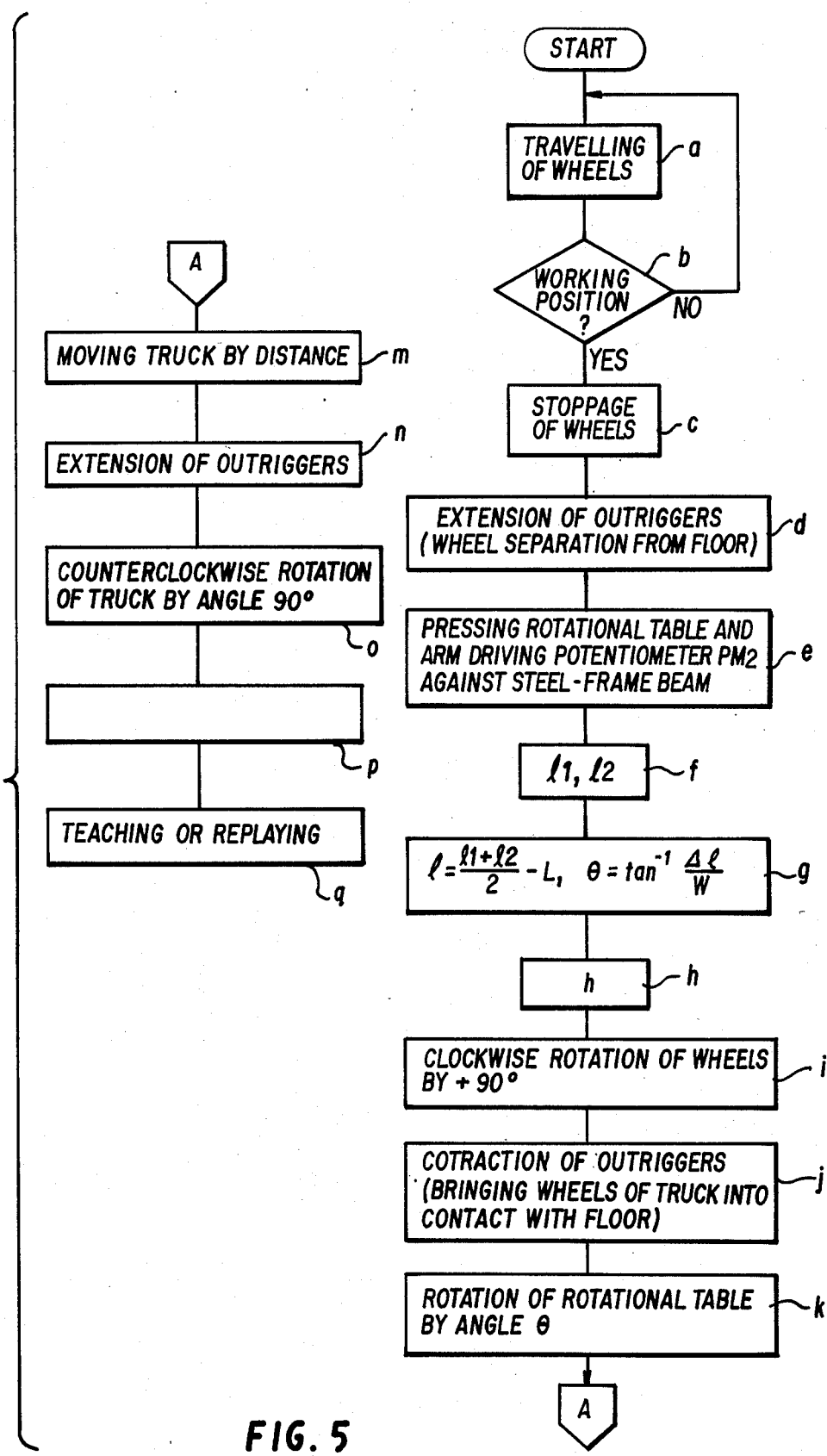
FIG. 5 is a flow chart showing a control operational procedure.

The above procedure as shown in FIG. 5 is only one applicable example of the industrial robot according to the present invention, and therefore the industrial robot of the present invention may be employed for any robots capable of working while traveling along a workpiece, e.g., a concrete spraying robot, a coating robot and an elongated object inspecting robot. Further, various modifications and changes of the working procedure may be made. For instance, the sequence of the working procedure may be modified as desired, or another working procedure may be added or inserted for the present procedure. In another embodiment, the tilt angle ($\theta$) is calculated by detecting the distance $l_1$ and $l_2$ in the step (e), and then the truck 1 is rotated by the angle of ($\theta + 90°$) to hold the same at a right angle to the iron beam 25. At the same time, the table 7 is rotated by the angle ($\theta$) and is retained at an right angle to the iron beam 25, in which circumstance a distance between the table 7 and the point $P_0$ of the iron beam 25 is measured again to detect the value (l), thus eliminating influence of the tilt angle ($\theta$) in calculation of the value (l).

Further, the amount of deflection $\Delta h$ of the iron beam 25 as obtained in the step (h) is stored in the RAM as is, and is accessed in the subsequent replaying operation so as to be employed for adjustment of the vertical position of the spray gun or the like.

Although specific embodiments of the invention have been described, will be appreciated that the invention is susceptible to modification, variation or change without departing from its proper scope as exemplified by the following claims.

What is claimed is:
1. A self-traveling robot system, comprising:
a robot for working on a continuous object;
means for moving said robot along said continuous object;

a swiveling table mounted on said means for moving said robot and provided with vertically extending outrigger members;

arm means provided on said swiveling table, said arm means having a plurality of degrees of freedom;

distance detection means mounted to said robot for detecting a distance between said robot and said continuous object;

means to separate said outrigger members from said members for moving said robot and which includes means for rotating said means for moving said robot at a right angle;

a deviation detecting circuit for comparing said distance as detected by said distance detection means with a predetermined value and detecting a deviation between said distance and said predetermined value; and travel path correcting means for correcting an advance direction of said means for moving said robot according to said deviation.

2. A method of positioning a self-traveling robot system with respect to a workpiece, the robot including wheeled transport means capable of traveling on a floor, a swiveling table mounted on said transport means and provided with vertically extending outriggers, and arm means provided on said swiveling table, said arm means having a plurality of degrees of freedom, which comprises:

(a) driving said robot to a working position and detecting distances between said swiveling table and first and second measuring points on said workpiece;

(b) calculating a tilt angle ($\theta$) of said swiveling table relative to said workpiece and a deflection amount (l) from said swiveling table to a reference travel path on which said robot normally travels according to data obtained regarding said distance;

(c) extending said outriggers to separate said transport means from said floor, and then rotating said transport means at a right angle to said workpiece;

(d) contracting said outriggers after said step (c) to bring said transport means into contact with said floor, and then rotating said swiveling table to a position parallel to said workpiece;

(e) moving said transport means by said deflection amount (l) to register a center of said transport means with said reference travel path; and (f) extending said outriggers to separate said transport means from said floor, then rotating said transport means to a position parallel to said workpiece, and further contracting said outriggers.

3. A self-traveling robot system for traveling with respect to a workpiece, comprising:

wheeled transport means capable of traveling on a floor;

a swiveling table mounted on said transport means and provided with vertically extending outriggers;

arm means provided on said swiveling table, said arm means having a plurality of degrees of freedom;

means for driving said robot to a working position and detecting distances between said swiveling table and said first and second measuring points on said workpiece;

means for calculating a tilt angle ($\theta$) of said swiveling table relative to said workpiece and a deflection amount (l) from said swiveling table to a reference travel path on which said robot normally travels according to data obtained regarding said distance;

means for extending said outriggers to separate said transport means from said floor and for subsequently rotating said transport means at a right angle to said workpiece;

means for contracting said outriggers after said transport means is brought into contact with said floor, and for subsequently rotating said swiveling table to a position parallel to said workpiece;

means for moving said transport means by said deflection amount (l) to register a center of said transport means with said reference travel path; and means for extending said outriggers to separate said transport means from said floor and for subsequently rotating said transport means to a position parallel to said workpiece and for further contracting said outriggers.

* * * * *